March 10, 1970 HISASHI KANEKO ET AL 3,500,206

ANGLE MODULATION SIGNAL COMPANDING SYSTEM

Filed March 1, 1967

INVENTORS
HISASHI KANEKO
ATSUSHI TOMOZAWA
BY
Hopgood & Calimafde
ATTORNEYS

3,500,206
ANGLE MODULATION SIGNAL COMPANDING SYSTEM

Hisashi Kaneko and Atsushi Tomozawa, Tokyo, Japan, assignors to Nippon Electric Company, Limited, Tokyo, Japan, a corporation of Japan Filed Mar. 1, 1967, Ser. No. 619,657
Claims priority, application Japan, Mar. 4, 1966, 41/13,310
Int. Cl. H04b 1/62
U.S. Cl. 325—46 4 Claims

ABSTRACT OF THE DISCLOSURE

A signal transmission system including a transmitter having a frequency modulator for producing a frequency-modulated carrier wave modulated in response to the low frequency analogue signals to be transmitted. A local demodulator is provided for non-linearly expanding the low frequency analogue signal component contained as the modulating signal component in such a manner that the large amplitude component may be expanded relative to the small amplitude component, and for feeding back the expanded signal in reversed phase to the analogue signal input terminal of the frequency modulator. The local demodulator circuit comprises an amplitude modulator, a frequency discriminator, a level detector, a bias-voltage adder which negatively feeds back the low frequency analogue signal component contained as the modulating component in the modulated carrier signal after subjecting the analogue signal component to nonlinear expansion so that the high level component may be expanded and the amplitude expansion may be performed as a whole.

This invention relates to a signal transmission system using angular modulation, such as frequency modulation or phase modulation, and more particularly to a signal transmission system of the kind having companding characteristics.

For the purpose of convenience, this invention will be explained with reference to a frequency-modulated signal transmission system, although the principles are applicable to other signal transmission systems.

During transmission of an analogue signal, such as a speech signal, from a transmitting site to a receiving site by the use of a carrier wave, a noise of constant magnitude is unavoidably introduced into the signal wave in the transmission path and may originate in the transmitter, the transmission line, or the receiver portion of the signal path. Furthermore, even when the signal transmission is by way of frequency modulation, the signal-to-noise ratio of the receive signal is reduced in accordance with reductions in the amplitude of the analogue signal contained in the transmitted carrier wave as the modulating component is reduced.

In order to eliminate these difficulties, transmission systems have been devised wherein a small amplitude component of the analogue signal to be transmitted is expanded at the transmitter end compared with a larger amplitude component, to effect amplitude compression. Then at the receiver end, the amplitude of the received analogue signal which was transmitted after being subjected to amplitude compression is expanded and reproduced by the receiver. However, the desired companding characteristics cannot be obtained by such conventional systems despite the number of constituent elements employed.

Accordingly, it is an object of the present invention to provide a signal transmission device of the general type described which will provide substantially improved companding characteristics over those obtainable with prior art systems.

It is another object of this invention to provide a transmission system of the type referred to which will provide the desired improvement in characteristics by means of structure substantially simpler than that heretofore employed.

Figure 1:
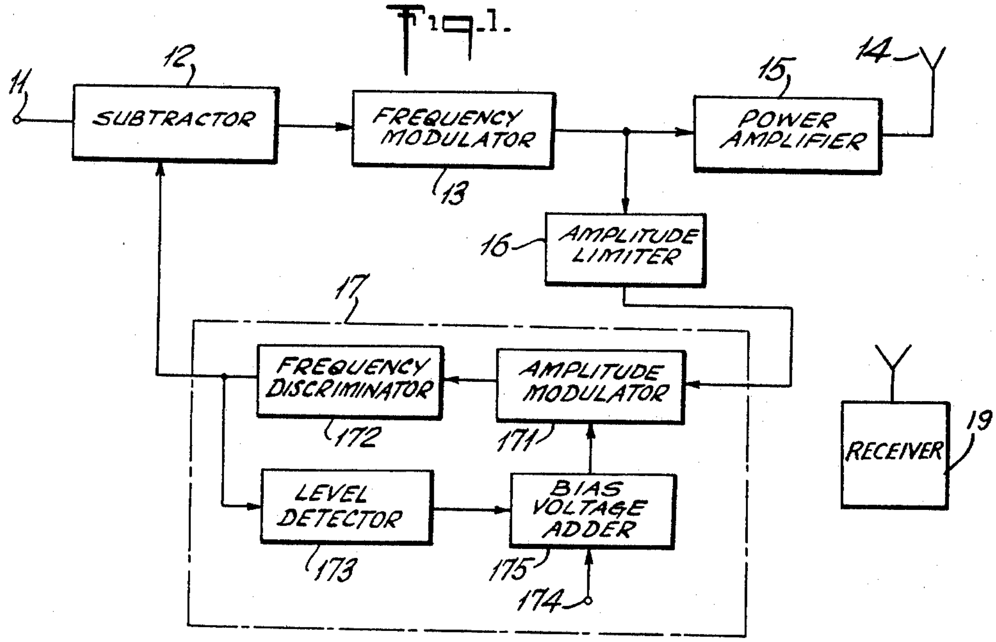

All of the objects, features and advantages of this invention and the manner of attaining them will become more apparent and the invention itself will be best understood by reference to the following description of the invention taken in conjunction with the accompanying drawing in which:

FIG. 1 is a schematic block diagram of one embodiment of the present invention.

Figure 2:
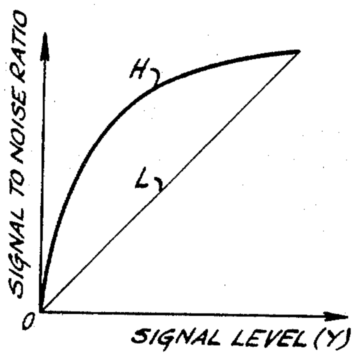

FIG. 2 a graph useful in explaining the operation of the embodiment, and

Figure 3:
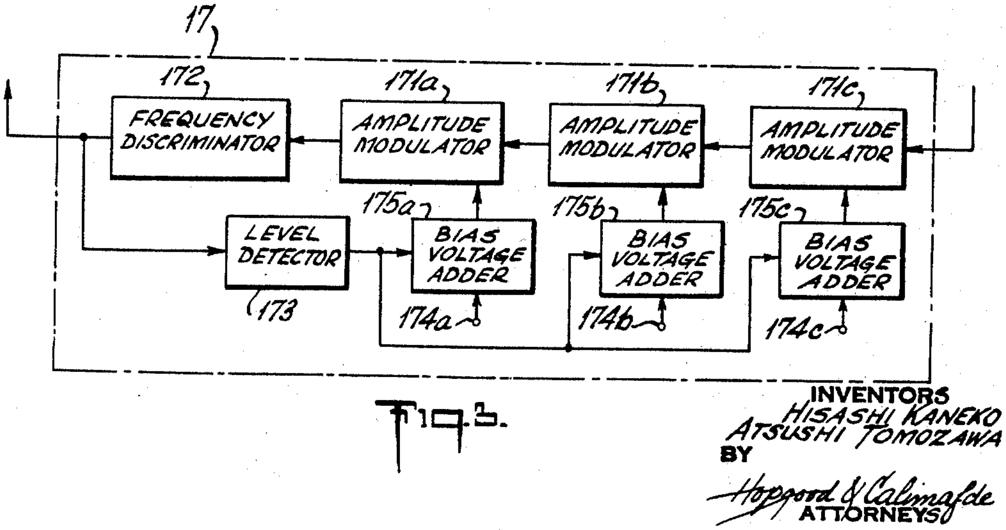

FIG. 3 is a schematic block diagram of another embodiment of the invention which is a modification of the embodiment shown in FIG. 1.

In accordance with one aspect of the present invention, there is provided a signal transmission system including a transmitter having a frequency modulator for producing a frequency-modulated carrier wave modulated in response to the low frequency analogue signals to be transmitted. The system also includes a local demodulator for expanding in a non-linear manner, the low frequency analogue signal component contained as the modulating signal component in a portion of the modulated carrier wave received through an amplitude limiter (in such a manner that the large amplitude component may be expanded relative to the small amplitude component), and for feeding back the expanded signal in reversed phase to the analogue signal input terminal of the frequency modulator. The system further includes a receiver comprising a demodulator circuit having demodulating characteristics identical to those of the local demodulator circuit of the transmitter. The local demodulator circuit comprises an amplitude modulator, a frequency discriminator, a level detector, and a bias-voltage adder which negatively feeds back the low frequency analogue signal component contained as the modulating component in the modulated carrier signal after subjecting the analogue signal component to nonlinear expansion so that high level component may be expanded and the amplitude expansion may be performed as a whole. Accordingly, the signal transmission is performed as a whole with the low frequency analogue being subjected to nonlinear compression. Since the demodulator circuit of the receiver has the same expansion characteristics as the local modulator circuit of the transmitter, the low frequency analogue signal having the same waveform as the signal at the transmitter end is reproduced at the output terminal of the receiver. As a result, the above-mentioned degradation of the signal-to-noise ratio of the received signal with prior art systems is not caused with the system of this invention because the amplitude of the transmitted signal is compressed during transmission. Also, the device of the present invention has superior nonlinear companding characteristics compared with the above-mentioned conventional systems, because the dynamic range of the nonlinear companding characteristics of the local demodulator device can be made relatively large by suitably choosing the over-all gain of the level detector and the bias voltage applied to the bias voltage adder.

Referring now to FIG. 1, there is shown a frequency-modulation transmitter and receiver according to the invention which comprises a signal input terminal 11 for receiving a low frequency signal to be transmitted, such as a speech signal, from a signal source, and a subtractor circuit 12 for receiving a low frequency signal from the terminal 11 as one of two input signals. A frequency-modulator 13 is also provided and comprises a voltage-controlled variable frequency oscillator for producing a carrier signal frequency-modulated by the output of the subtractor circuit 12. The frequency modulation transmitter further comprises a power amplifier 15 for amplifying the power of the modulated carrier signal and for supplying the amplified signal to a transmitting antenna 14. An amplitude limiter circuit 16 is provided for limiting the amplitude of a portion of the modulated carrier signal fed back from the frequency modulator circuit 13. Also included is a local demodulator 17 for demodulating the output from the limiter 16 and for supplying the demodulated output to another input of the subtractor circuit 12. Negative feedback to provided by means of this local demodulator 17, as will be understood from the description which follows.

The local demodulator 17 comprises the following: an amplitude modulator 171 for superimposing an amplitude modulation component on the frequency modulated carrier signal supplied from the amplitude limiter circuit 16; a frequency discriminator 172 for demodulating the amplitude modulated carrier wave signal supplied from the modulator 171 and for supplying the demodulated output to the subtractor circuit 12; a level detector 173 having a bandpass filter, a detector, and a smoothing capacitor to produce an output voltage representative of the level of the output signal supplied from the circuit 172; and a bias voltage adder 175 for producing the sum of the bias voltage received at a terminal 174 from a bias voltage source (not shown) and the output voltage of the detector 173, and for supplying the sum voltage to the amplitude modulator 171 as the modulating voltage.

Among the constituent elements of the embodiment, a balanced modulator may be used as the amplitude modulator 171. A demodulator circuit, which is responsive not only to the frequency of the signal but also to the amplitude thereof, such as the Foster-Seeley circuit, should preferably be used as the frequency discriminator 172. The level detector circuit 173, as mentioned above, comprises a bandpass filter, a rectifier, and a smoothing circuit, and produces the direct-current output, which is proportional to the mean value of the amplitude of the low frequency signal output of the frequency discriminator 172.

When the level of the low frequency signal from the frequency discriminator 172 is relatively small, the level of the low frequency signal applied to the modulator 13 is almost equal to that of the input signal, because the subtracting voltage is small. However, when the level of the low frequency signal from the frequency discriminator 172 is large, the level of the low frequency signal applied to the frequency modulator 13 as the modulating signal is compressed compared with the case of small input levels, because the voltage applied to the subtractor circuit 12 as the subtracting voltage becomes large. In other words, the amplitude characteristics of the modulation process can be represented by an inverse function of the characteristics of the local demodulator, because the frequency modulation performance of this transmitter is controlled by negative feedback. Therefore, when the amplitude companding characteristics are made to be nonlinear characteristics, the frequency modulation is performed according to the amplitude companding characteristics corresponding to the inverse function of the nonlinear characteristics.

Now, assuming the low frequency analogous signal contained in the frequency modulator circuit 13 as the modulating voltage component to have a value of X, the output low frequency signal of the frequency discriminator circuit 172 to have a value of Y, the over-all gain of the level detector 173 to have a value of A, and the bias voltage applied to the terminal 174 to have a value of B, the modulating signal applied from the bias adder circuit 175 to the amplitude modulator circuit 171 is given by the relation:

$$M=AY+B$$

Since the frequency discriminator circuit 172, as mentioned above, responds not only to the fluctuation of the frequency but also to that of the amplitude and produces an output fluctuating in proportion to both of these fluctuations, the signal level is represented by the relation, $$Y=MX=X(AL+B)$$

By solving this equation with regard to Y, the following relation is obtained:

$$Y=BX/(1-AX) \qquad (1)$$

From this relation it will be understood that the output level Y of the local demodulator circuit 17 is represented by a hyperbolic function of the input level X (of the low frequency analogue signal contained in the modulated carrier wave as the modulating component). In other words, the hyperbolic expansion is performed in the process of the conversion of the input level X to the output level Y.

Now, when a local demodulator such as 17 is used as the demodulator in the receiver 19, the signal-to-noise ratio $S/N$ of the received signal observed at the output terminal of this demodulator 17 is proportional to the above-ementioned signal level value X and represented by the following relation:

$$S/N=kX \qquad (2)$$

($k$ being a constant) because the low frequency analogue signal of the level X contained in the input modulated carrier wave signal to the demodulator 17 contains a noise component of constant level. By solving the Equation 1 for X and inserting the result into the Equation 2, the following relation is obtained:

$$S/N=kY/(AY+B) \qquad (3)$$

In FIG. 2, in which the signal level Y and the signal-to-noise ratio $S/N$ are taken at the abscissa and ordinate, respectively, the relation of the Equation 3 is shown by the curve H, which is a part of the hyperbola. As is obvious from the comparison between the Equations 1 and 3, the signal-to-noise ratio of the received signal observed at the receiver is improved as shown by the curve H, by way of giving the hyperbolic expansion characteristics of the Equation 1 to the local demodulator circuit 17. Considering the fact that when the amplitude characteristic of the local demodulator circuit 17 is linear and the signal-to-noise ratio characteristic corresponding to the linear characteristic is also linear as shown by the line L in FIG. 2, the improvement of the signal-to-noise ratio shown in the curve H will be apparent. Inasmuch as the over-all gain A and the bias voltage B can be chosen arbitrarily, the improvement in the signal-to-noise ratio represented by the Equation 3 can be made quite large.

In case the improvement in the signal-to-noise ratio is not sufficient even if the over-all gain A and the bias voltage B are varied in the manner described above, the hyperbolic characteristics of the Equation 3 may be changed to the higher order hyperbolic characteristics. Referring to FIG. 3, which shows a modification of the embodiment of FIG. 1 to achieve this object, the local demodulator circuit 17 includes three bias voltage adder cricuits **175*a*, 175*b* and 175*c* instead of the single bias adder circuit 175 of FIG. 1. These adder circuits 175*a*, 175*b* and 175*c*** receive bias voltages B*a*, B*b* and B*c* from the terminals **174*a*, 174*b* and 174*c*, respectively. Furthermore, instead of the circuit 171 of FIG. 1, three amplitude modulator circuits 171*a*, 171*b* and 171*c*** are provided, each of which receives, as a modulating voltage, an output voltage from its corresponding modulator circuit as shown in FIG. 3. The signal-to-noise ratio $S/N$ is obtained in the same manner as in the case of the Equation 3, by the expression, $$S/N=kY/(AY+B_1)(AY+B_2)(AY+B_3) \quad (4)$$

Thus it will be clearly understood that the signal-to-noise ratio can be improved considerably by the circuit arrangement of FIG. 3.

Although the above-mentioned embodiment and its modification include the subtractor circuit 12 as means for negatively feeding back the output of the local demodulator circuit 17 to the input terminal of the frequency modulator circuit 13, it will be apparent to those skilled in the art that it may be replaced by the adder circuit, because this subtractor circuit 12 is arranged to produce the algebraic sum of two signals. Also, besides the above-mentioned modifications, it will be apparent that a number of other modifications can be made within the technical scope of the invention. Additionally, although the invention has been explained with particular reference to a frequency-modulated signal transmission system, it will be apparent that the principle of the present invention can be employed in a signal transmission system using phase modulation techniques.

What is claimed is:

1. An angular modulation transmitter for a signal transmission system comprising an angle modulator for producing an angularly-modulated carrier wave modulated in response to the instantaneous value of the information signal to be transmitted, a local demodulator for feeding back to the input side of said angle modulator the component of said information signal contained in said angularly-modulated carrier wave after nonlinearly companding said component, said local demodulator having means for amplitude-modulating a portion of said angularly-modulated carrier wave so as to produce an amplitude fluctuation in said portion, said local demodulator further including demodulating means for producing the output voltage proportional to both said angularly-modulated component and said amplitude-modulated component by way of demodulating the output of said amplitude-modulating means, said local demodulator further having a level detecting means for producing the voltage proportional to the amplitude of said output voltage of said demodulating means, and said local demodulator also having a voltage adding means for supplying the sum of the output voltage of said level detecting means and a predetermined bias voltage applied to said amplitude modulating means as the modulating signal.

2. The invention described in claim 1 wherein said local demodulator further includes negative feedback means.

3. The invention described in claim 1 wherein said local demodulator further includes another amplitude-modulating means in cooperative relationship with another voltage adding means, whereby the signal-to-noise ratio of said transmitter is further improved.

4. An angular modulation signal transmission system comprising a transmitter having an angle modulator for producing an angularly-modulated carrier wave modulated in response to the instantaneous value of the information signal to be transmitted, a local demodulator for feeding back to the input side of said angle modulator the component of said information signal contained in said angularly-modulated carrier wave after nonlinearly companding said component, said local demodulator having means for amplitude-modulating a portion of said angularly-modulated carrier wave so as to produce an amplitude fluctuation in said portion, said local demodulator further including demodulating means for producing the output voltage proportional to both said angularly-modulated component and said amplitude-modulated component by way of demodulating the output of said amplitude-modulating means, said local demodulator further having a level detecting means for producing the voltage proportional to the amplitude of said output voltage proportional to the amplitude of said output voltage of said demodulating means, said local demodulator also having a voltage adding means for supplying the sum of the output voltage of said level detecting means and a predetermined bias voltage applied to said amplitude modulating means as the modulating signal, and a receiver comprising a demodulator having nonlinear companding characteristics substantially identical to that of said local demodulator.

References Cited

UNITED STATES PATENTS

| | | | |
|---|---|---|---|
| 2,672,589 | 3/1954 | McLeod. | |
| 3,238,456 | 3/1966 | Greefkes | 325—46 |
| 3,311,827 | 3/1967 | Greefkes et al. | 325—46 |

ROBERT L. GRIFFIN, Primary Examiner

JAMES A. BRODSKY, Assistant Examiner

U.S. Cl. X.R.

325—62, 65, 147, 159; 328—175; 333—14